(12) United States Patent
Ueno

(10) Patent No.: US 10,280,982 B2
(45) Date of Patent: May 7, 2019

(54) JOINT MECHANISM AND IMAGE FORMING APPARATUS USING THE SAME

(71) Applicant: KYOCERA Document Solutions Inc., Osaka-shi (JP)

(72) Inventor: Daijiro Ueno, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/987,305

(22) Filed: May 23, 2018

(65) Prior Publication Data

US 2018/0348695 A1    Dec. 6, 2018

(30) Foreign Application Priority Data

May 31, 2017    (JP) .................. 2017-107430

(51) Int. Cl.
| F16D 1/06 | (2006.01) |
| F16D 1/10 | (2006.01) |
| B65H 5/06 | (2006.01) |
| F16D 1/108 | (2006.01) |
| F16D 1/112 | (2006.01) |

(52) U.S. Cl.
CPC ............. *F16D 1/06* (2013.01); *B65H 5/06* (2013.01); *F16D 1/10* (2013.01); *F16D 1/108* (2013.01); *F16D 1/112* (2013.01); *B65H 2403/80* (2013.01); *F16D 2001/062* (2013.01)

(58) Field of Classification Search
CPC ........ F16D 1/10; F16D 1/06; F16D 2001/062; F16D 1/108; F16D 1/112; B65H 5/06; B65H 2403/80; G03G 21/1647
See application file for complete search history.

(56) References Cited

U.S. PATENT DOCUMENTS 5,464,301 A * 11/1995 Kramer ................ F16D 1/108
244/173.3
2014/0369745 A1* 12/2014 Nakagawa ............ F16D 3/50
403/361

(Continued)

FOREIGN PATENT DOCUMENTS

| JP | 11-43229 | 2/1999 |
| JP | 2004-051255 | 2/2004 |

*Primary Examiner* — David H Bollinger
(74) *Attorney, Agent, or Firm* — Gerald E. Hespos; Michael J. Porco; Matthew T. Hespos

(57) ABSTRACT

The joint mechanism includes an engagement pin; a first coupling having a pair of projections with engagement recessed portions formed respectively, the engagement recessed portions with which both end portions of the engagement pin are freely engaged or disengaged; a second coupling including a circumferential wall having an opening portion and a pair of projecting pieces; and a biasing member. The pair of projecting pieces are arranged in the engagement recessed portions so as to be opposed, on an upstream side in a rotation direction, to opening defining surfaces of the pair of projections, with the second coupling attached to the first coupling. Both end portions of the engagement pins are engaged with the engagement recessed portions so as to be each sandwiched between each of the pair of projecting pieces being applied a biasing force of the biasing member and each opening defining surface of the pair of projections.

5 Claims, 14 Drawing Sheets

(56) References Cited

U.S. PATENT DOCUMENTS

| | | | | |
|---|---|---|---|---|
| 2015/0125182 A1* | 5/2015 | Woo | ......................... | H02K 7/14 |
| | | | | 399/167 |
| 2017/0017192 A1* | 1/2017 | Sakurai | ................ | G03G 15/757 |
| 2017/0089399 A1* | 3/2017 | Gharib | .................. | E21B 17/046 |
| 2018/0252052 A1* | 9/2018 | Attiwell | ................ | E21B 17/042 |
| 2018/0348695 A1* | 12/2018 | Ueno | ................. | G03G 21/1647 |

\* cited by examiner

US 10,280,982 B2

JOINT MECHANISM AND IMAGE FORMING APPARATUS USING THE SAME

INCORPORATION BY REFERENCE

The present application claims priority from Japanese Patent Application No. 2017-107430 filed on May 31, 2017, disclosure of which is all incorporated herein by reference.

BACKGROUND

The present disclosure relates to a joint mechanism and an image forming apparatus. More specifically, the present disclosure relates to a joint mechanism which links, on the same axis, a follower shaft such as a rotation shaft of a roller member provided in an image forming apparatus, and a drive shaft which transmits a driving force to the follower shaft, and an image forming apparatus including the joint mechanism.

As an image forming apparatus such as a printer, a copying machine, and the like, a joint mechanism which links a drive shaft and a follower shaft on the same axis is known. A known joint mechanism of this kind is configured to include an engagement pin, and a coupling having an engagement recessed portion with which the engagement pin is freely engaged or disengaged. In the drive shaft and the follower shaft, the engagement pin is provided in one shaft and the coupling is provided in the other shaft.

In a joint mechanism, insertion of an engagement pin into an engagement recessed portion of a coupling to engage with the engagement recessed portion results in linking a drive shaft and a follower shaft on the same axis. This enables a rotation driving force of the drive shaft to be transmitted to the follower shaft.

SUMMARY

A joint mechanism according to one aspect of the present disclosure is a joint mechanism which links a drive shaft and a follower shaft on the same axis along an axis direction and is capable of transmitting a rotation driving force of the drive shaft to the follower shaft, the drive shaft being driven to rotate in a predetermined rotation direction by a driving force from a driving source, and the follower shaft rotating in the rotation direction accompanying rotation of the drive shaft. The joint mechanism includes an engagement pin, a first coupling, a second coupling, and a biasing member.

The engagement pin is provided at a front end portion of the drive shaft and has both end portions projecting from a circumference surface of the drive shaft in a radial direction. The first coupling is supported at a front end portion of the follower shaft so as to be rotatable following the follower shaft on the same axis and has a pair of projections with engagement recessed portions formed respectively, the engagement recessed portions with which both end portions of the engagement pin are freely engaged or disengaged. The second coupling includes a top wall and a circumferential wall and is attached to the first coupling so as to cover the pair of projections, the top wall having an opening portion into which the drive shaft provided with the engagement pin is allowed to be inserted, and the circumferential wall extending from an outer circumference edge of the top wall along the axis direction and having a pair of projecting pieces projecting inwardly from an inner circumference surface. The biasing member biases the second coupling attached to the first coupling in the rotation direction with respect to the first coupling.

The pair of projecting pieces are arranged in the engagement recessed portions, in a state where the second coupling is attached to the first coupling, so as to be opposed, on an upstream side in the rotation direction, to opening defining surfaces of the pair of projections, the opening defining surfaces each defining an opening side end portion of each of the engagement recessed portions on a downstream side in the rotation direction. Both end portions of the engagement pin inserted from the opening portion of the top wall are engaged with the respective engagement recessed portions so as to be each sandwiched between each of the pair of projecting pieces being applied an biasing force of the biasing member and each of the opening defining surfaces of the pair of projections.

An image forming apparatus according to another aspect of the present disclosure includes a drive shaft driven to rotate in a predetermined rotation direction by a driving force from a driving source; a roller member which has a follower shaft that rotates accompanying rotation of the drive shaft in the rotation direction and which transports a sheet by the rotation of the follower shaft; an image forming portion which forms an image on a sheet transported by the roller member; and the above joint mechanism which links the drive shaft and the follower shaft on the same axis along an axis direction.

DETAILED DESCRIPTION

In the following, description will be made of a joint mechanism and an image forming apparatus according to one embodiment of the present disclosure with reference to the drawings. The following description will be made using XYZ orthogonal coordinate axes regarding directions. An X direction corresponds to a right and left direction (+X represents right and −X represents left), a Y direction corresponds to a front-rear direction (+Y represents front and −Y represents rear), and a Z direction corresponds to an up-down direction (+Z represents up and −Z represents down). Additionally, in the following description, the term "sheet" denotes copy paper, coated paper, an OHP sheet, a board, a postcard, tracing paper, other sheet material to be subjected to image forming processing, or a sheet material to be subjected to arbitrary processing other than the image forming processing.

[Overall Configuration of Image Forming Apparatus]

Figure 1:
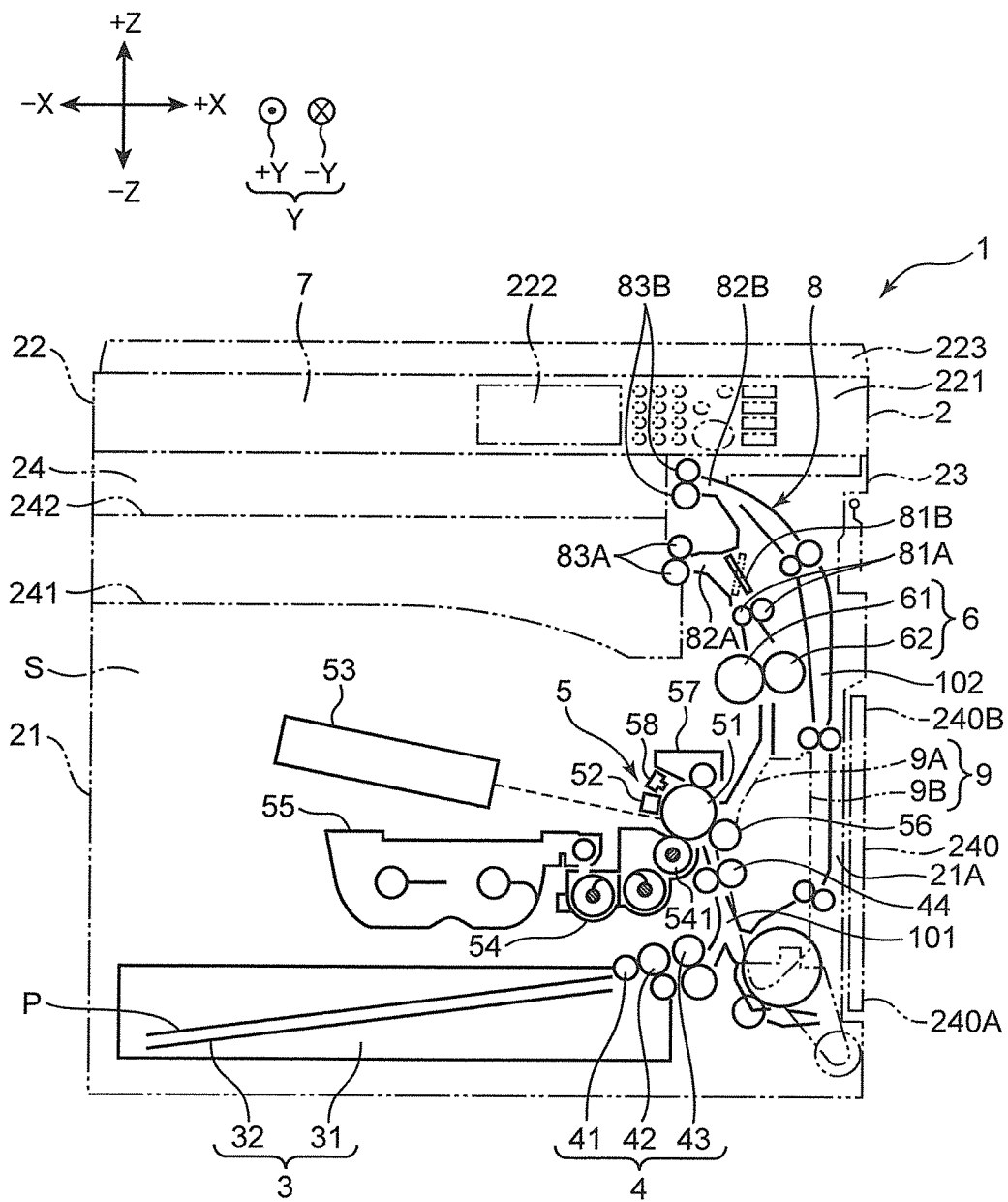
FIG. 1 is a view schematically showing an internal structure of an image forming apparatus according to one embodiment of the present disclosure.

FIG. 1 is a view schematically showing an internal structure of an image forming apparatus 1 according to one embodiment of the present disclosure. The image forming apparatus 1 is an electrophotography device which forms an image on a sheet P. Although a monochrome copying machine is illustrated herein as the image forming apparatus 1, the image forming apparatus 1 may be a printer, a facsimile device, or a multifunctional machine equipped with these functions, or may be a device which forms color images.

The image forming apparatus 1 includes an apparatus main body 2, and a sheet housing portion 3, a sheet feeding portion 4, an image forming portion 5, a fixing portion 6, an image reading portion 7, a sheet ejection portion 8, and a transportation unit 9 which are disposed in the apparatus main body 2.

The apparatus main body 2 includes a lower casing 21 having a rectangular solid-shape in an appearance view, and a rectangular solid-shaped upper casing 22 arranged on the lower casing 21 so as to be opposed to the lower casing 21. The lower casing 21 and the upper casing 22 are linked by a link portion 23 forming a part of the lower casing 21. The link portion 23 is provided to stand from a +X side (a right side) side portion of the lower casing 21. The upper casing 22 has a +X side region thereof supported by a +Z side (an upper side) end portion (an upper end portion) of the link portion 23. The sheet P subjected to image forming processing is ejected by the sheet ejection portion 8 to an ejection space 24 surrounded by the lower casing 21, the upper casing 22, and the link portion 23.

In the upper casing 22, the image reading portion 7 is disposed. The image reading portion 7 is an apparatus for reading an image of an original document and includes an original document pressing cover 223 disposed on the +Z side of the upper casing 22. The original document pressing cover 223 is attached to the upper casing 22 to be turnable in an up-down direction and is used for pressing an original document. Analog information of an original document image read by the image reading portion 7 is converted into a digital signal and then output toward an exposure device 53 to be described later, and subjected to the image forming processing.

The upper casing 22 has a +Y side (a front side) region in which an operation portion 221 is disposed. The operation portion 221 includes, for example, an LCD (Liquid Crystal Display) touch panel 222. The operation portion 221 is configured to be capable of inputting information related to the image forming processing. A user is allowed to input, for example, the number of sheets P to be printed, a printing density, and the like through the LCD touch panel 222.

The lower casing 21 has a +X side portion in which a manual feed tray 240 is disposed. The manual feed tray 240 has an upper end 240B side turnable in the up-down direction with a lower end 240A as a supporting point. The manual feed tray 240 is allowed to change a position thereof between a closed position of rising for closing a manual sheet feeding port and an open position of projecting to the +X side. The manual feed tray 240 set in the open position serves for manual feeding of the sheets P one by one.

In an internal space S of the lower casing 21, the sheet housing portion 3, the sheet feeding portion 4, the image forming portion 5, the fixing portion 6, the sheet ejection portion 8, and the transportation unit 9 are disposed.

The sheet housing portion 3 includes a cassette 31 detachably attached to the lower casing 21 to house the sheet P, a lift plate 32 which supports the sheet P in the cassette 31, and the sheet feeding portion 4. The lift plate 32 slants so as to push up a front edge of the sheet P to the +Z side. The sheet feeding portion 4 is a sheet feeding portion which feeds the sheet P housed in the cassette 31, and includes a pick-up roller 41, a sheet feeding roller 42, and an assist roller 43.

In the sheet feeding portion 4, the pick-up roller 41, the sheet feeding roller 42, and the assist roller 43 send out the sheets P housed in the cassette 31 to a main transportation path 101 one by one. Specifically, the pick-up roller 41 sends out the upper most one of the sheets P housed in the cassette 31. The sheet feeding roller 42 feeds the sheet P sent out by the pick-up roller 41 toward the assist roller 43. The assist roller 43 sends the sheet P from the sheet feeding roller 42 to the main transportation path 101. The pick-up roller 41, the sheet feeding roller 42, and the assist roller 43 are arranged to have respective rotation axes set in the same direction (a Y direction).

The main transportation path 101 is a transportation path disposed to pass a transfer nip portion formed between a photosensitive drum 51 and a transfer roller 56 in the image forming portion 5 from the sheet feeding portion 4 via a resist roller pair 44. The resist roller pair 44 defines a position of the sheet P in a direction orthogonal to a sheet transportation direction. The resist roller pair 44 transports the sheet P to the image forming portion 5 at timing when a toner image (a developer image) is transferred to the sheet P in the image forming portion 5.

The image forming portion 5 subjects the sheet P supplied from the sheet feeding portion 4 to the image forming processing. The image forming portion 5 includes the photosensitive drum 51, a charger 52, the exposure device 53, a developing device 54, a toner container 55, the transfer roller 56, a cleaning device 57, and a static eliminator 58.

The photosensitive drum 51 is a tubular drum driven to rotate around a rotation axis extending in the Y direction. The photosensitive drum 51 carries an electrostatic latent image on a circumference surface thereof and carries a toner image corresponding to the electrostatic latent image. The charger 52 charges the circumference surface of the photosensitive drum 51 before carrying the electrostatic latent image.

The exposure device 53 irradiates the circumference surface of the photosensitive drum 51 with laser light, the circumference surface being charged by the charger 52, to form an electrostatic latent image. The developing device 54 includes a developing roller 541 which supplies a toner (developer) to the circumference surface of the photosensitive drum 51 on which an electrostatic latent image is formed. The developing roller 541 is a roller to be driven to rotate around a rotation axis parallel to the photosensitive drum 51 and capable of carrying a toner. The developing roller 541 develops an electrostatic latent image formed on the circumference surface of the photosensitive drum 51 by a carried toner upon application of a predetermined developing bias. The toner container 55 supplies a replenishment toner to the developing device 54.

The sheet P is sent via the main transportation path 101 and the resist roller pair 44 to the photosensitive drum 51 on which a toner image is formed by development by the developing device 54. The transfer roller 56 is a roller for transferring a toner image formed on the circumference surface of the photosensitive drum 51 to the sheet P. The transfer roller 56 is rotatable around a rotation axis parallel to the photosensitive drum 51 and comes into contact with the circumference surface of the photosensitive drum 51 to form the transfer nip portion. A transfer bias having a polarity opposite to that of a toner is applied to the transfer roller 56. The sheet P to which the toner image is transferred is separated from the photosensitive drum 51 and transported toward the fixing portion 6 by the transportation unit 9.

The transportation unit 9 is a unit having a function as a sheet transportation portion which transports the sheet P fed from the sheet feeding portion 4 to a downstream side in the sheet transportation direction via the image forming portion 5. The transportation unit 9 transports the sheet P toward the fixing portion 6 arranged downstream of the image forming portion 5 in the sheet transportation direction. The sheet transportation direction is generally the same as a direction heading from a −Z side (a lower side) to the +Z side (the upper side). The transportation unit 9 includes a first side surface 9A opposed to the image forming portion 5 to form the main transportation path 101, and a second side surface 9B opposed, at a rear of the first side surface 9A, to a side surface cover 21A of the lower casing 21 and forming a reverse transportation path 102. The above resist roller pair 44 and the transfer roller 56 are a part of the configuration of the transportation unit 9. The resist roller pair 44 and the transfer roller 56 are arranged on the first side surface 9A. The transportation unit 9 is swingably supported between the lower casing 21 and the side surface cover 21A. Opening the side surface cover 21A causes the main transportation path 101 and the reverse transportation path 102 to be exposed.

The cleaning device 57 removes an untransferred toner which is attached to the circumference surface of the photosensitive drum 51 after transfer of a toner image. The untransferred toner which is removed from the photosensitive drum 51 by the cleaning device 57 is transported toward a toner collection box not shown and is collected. The static eliminator 58 irradiates the photosensitive drum 51 having the circumference surface thereof cleaned by the cleaning device 57 with predetermined antistatic light. As a result, residual charges of the circumference surface of the photosensitive drum 51 are eliminated.

The fixing portion 6 has a function of subjecting the sheet P transported by the transportation unit 9 to fixing processing. The fixing portion 6 subjects the sheet P after toner image transfer to the fixing processing to fix the toner image on the sheet P. The fixing portion 6 includes a fixing roller 61 internally equipped with a heating source, and a pressurizing roller 62 which comes into contact with the fixing roller 61 by pressure to form a fixing nip portion with the fixing roller 61. When the sheet P to which a toner image is transferred is passed through the fixing nip portion, the toner image is fixed on the sheet P by heating by the fixing roller 61 and pressing by the pressurizing roller 62.

The sheet P after the fixing processing is transported to the downstream side in the sheet transportation direction by a transportation roller pair 81A of the sheet ejection portion 8 disposed above the fixing portion 6. On a downstream side of the transportation roller pair 81A, an ejection branch guide 81B is disposed. The ejection branch guide 81B has a function of switching a transportation direction of the sheet P on the downstream of the transportation roller pair 81A in the sheet transportation direction. The sheet P with the transportation direction switched by the ejection branch guide 81B is transported into a first ejection path 82A or a second ejection path 82B.

The sheet P after the fixing processing, when the sheet P is for single-side printing, is ejected toward the ejection space 24 by a first ejection roller pair 83A disposed on the first ejection path 82A, or ejected toward the ejection space 24 by a second ejection roller pair 83B disposed on the second ejection path 82B. The sheet P ejected to the ejection space 24 by the first ejection roller pair 83A is loaded in a first sheet loading portion 241 arranged in an upper surface portion of the lower casing 21. The sheet P ejected to the ejection space 24 by the second ejection roller pair 83B is loaded on a second sheet loading portion 242 arranged above the first sheet loading portion 241.

By contrast, in a case where the sheet P after the fixing processing is for double-side printing, the sheet having printing on one side completed, the sheet P is brought into a state of being nipped between the second ejection roller pair 83B disposed on the second ejection path 82B. In this state, the second ejection roller pair 83B is reversed to switch back the sheet P. This causes the sheet P to be reversely transported via the reverse transportation path 102 and successively again supplied to the image forming portion 5 with a front and a back of the sheet reversed, in which portion, the back face is subjected to the image forming processing. The sheet P having printing of both sides completed is ejected toward the ejection space 24 via the first ejection path 82A or the second ejection path 82B of the sheet ejection portion 8.

Additionally, the image forming apparatus 1 includes a joint mechanism which links, on the same axis, follower shafts such as rotation shafts of various roller members for transporting the sheet P, and a drive shaft which transmits a driving force to the follower shafts. In the following, description will be made of a joint mechanism applied to the sheet feeding roller 42 in the sheet feeding portion 4 of the sheet housing portion 3.

[Configuration of Joint Mechanism]

Figure 2:
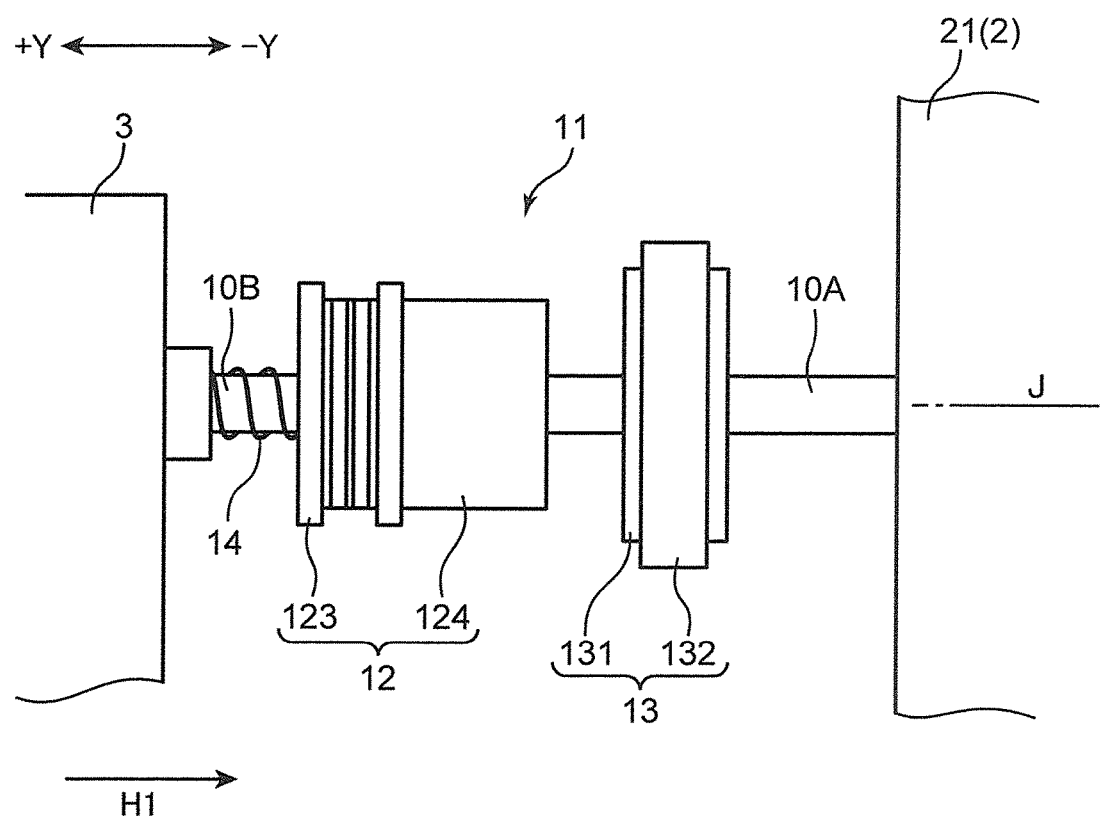
FIG. 2 is a view schematically showing a configuration of a joint mechanism provided in the image forming apparatus.

FIG. 2 is a view schematically showing a configuration of a joint mechanism 11 provided in the image forming apparatus 1. To the lower casing 21 of the apparatus main body 2, a drive shaft 10A is attached which is driven to rotate around an axis J by a driving force from a sheet feed driving motor (a driving source) which serves for causing the sheet feeding roller 42 to rotate. The drive shaft 10A extends from a −Y side to the +Y side along the Y direction (the front-rear direction). On the other hand, to the sheet housing portion 3, a follower shaft 10B is attached as a rotation shaft of the sheet feeding roller 42. The follower shaft 10B rotates accompanying rotation of the drive shaft 10A. The sheet feeding roller 42 transports the sheet P by the rotation of the follower shaft 10B. As described above, the sheet housing portion 3 is detachably attached to the lower casing 21. A movement direction H1 of the sheet housing portion 3 with respect to the lower casing 21 when attached to the lower casing is a direction from the +Y side to the −Y side along the axis direction (the Y direction).

The joint mechanism 11 is a mechanism which links the drive shaft 10A and the follower shaft 10B on the same axis along the axis direction to transmit a rotation driving force of the drive shaft 10A to the follower shaft 10B when the sheet housing portion 3 is moved along the movement direction H1 to be attached to the lower casing 21. The joint mechanism 11 includes a joint portion 12, a drive transmission portion 13, and a joint biasing member 14.

The joint biasing member 14 biases the joint portion 12 in the direction from the +Y side to the −Y side when the sheet housing portion 3 is attached to the lower casing 21. The joint biasing member 14 is a coil spring wound around the follower shaft 10B. In the joint mechanism 11, the joint portion 12 is a part which links the drive shaft 10A and the follower shaft 10B on the same axis. Details of the joint portion 12 will be described later.

The drive transmission portion 13 is a part which transmits a driving force from the sheet feed driving motor to the drive shaft 10A. The drive transmission portion 13 includes a one-way clutch 131 and a drive transmission gear 132. The drive transmission gear 132 is a gear which transmits a driving force from the sheet feed driving motor to the drive shaft 10A, and is provided on the drive shaft 10A on the same axis via the one-way clutch 131. The one-way clutch 131 is switched between a transmission state in which a driving force from the sheet feed driving motor is transmitted to the drive shaft 10A and a released state in which the transmission state is released.

In a state where the sheet housing portion 3 is detached from the lower casing 21, the one-way clutch 131 is in the released state. In other words, before a time when the sheet housing portion 3 is moved along the movement direction H1 to be attached to the lower casing 21, which is a time when the drive shaft 10A and the follower shaft 10B are linked by the joint portion 12, the one-way clutch 131 is in the released state. In a state where the sheet housing portion 3 is attached to the lower casing 21, and the drive shaft 10A and the follower shaft 10B are linked by the joint portion 12, at the timing when the sheet feed driving motor starts, the one-way clutch 131 is switched from the released state to the transmission state. During driving of the sheet feed driving motor, the one-way clutch 131 maintains the transmission state. Then, at the timing when the sheet feed driving motor stops, the one-way clutch 131 is switched from the transmission state to the released state. Even when the one-way clutch 131 is in the released state, unless the sheet housing portion 3 is detached from the lower casing 21, linkage of the drive shaft 10A and the follower shaft 10B by the joint portion 12 is maintained.

Figure 3:
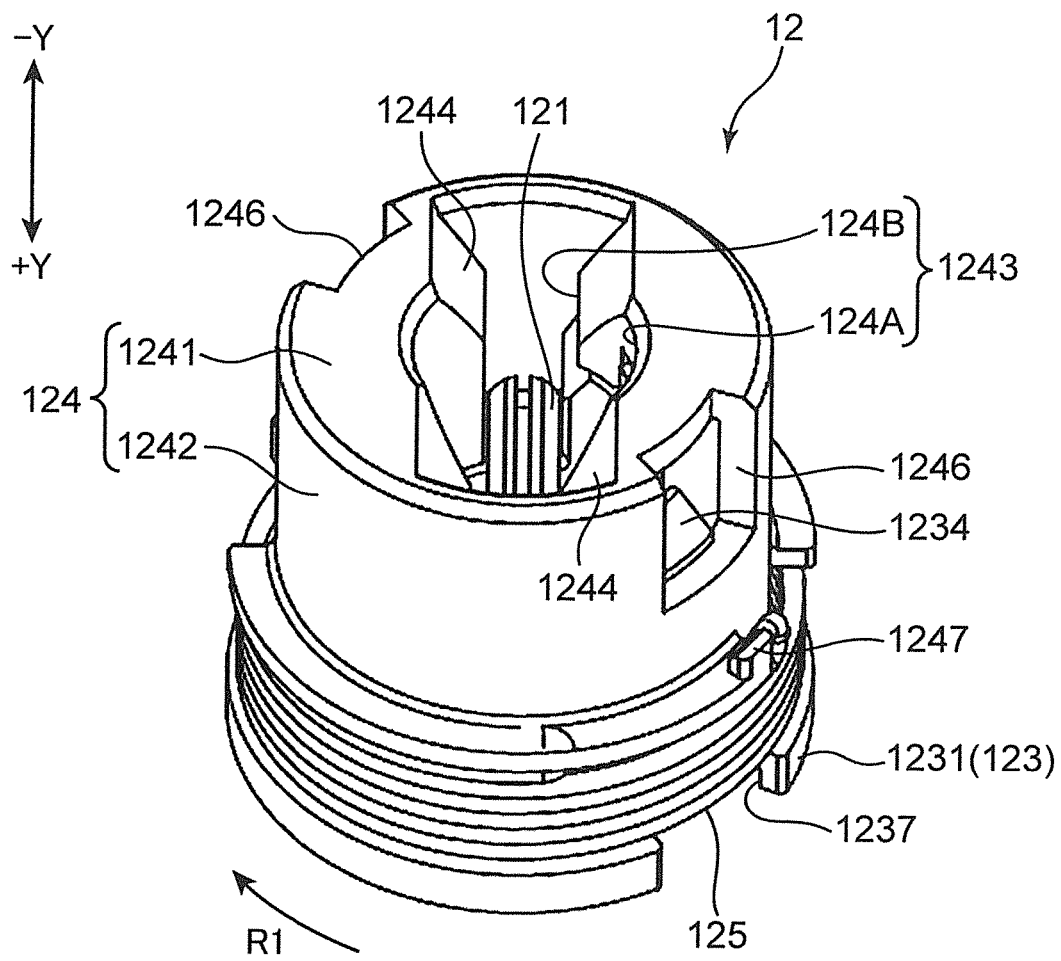
FIG. 3 is a perspective view showing a configuration of a joint portion of the joint mechanism.
Figure 4:
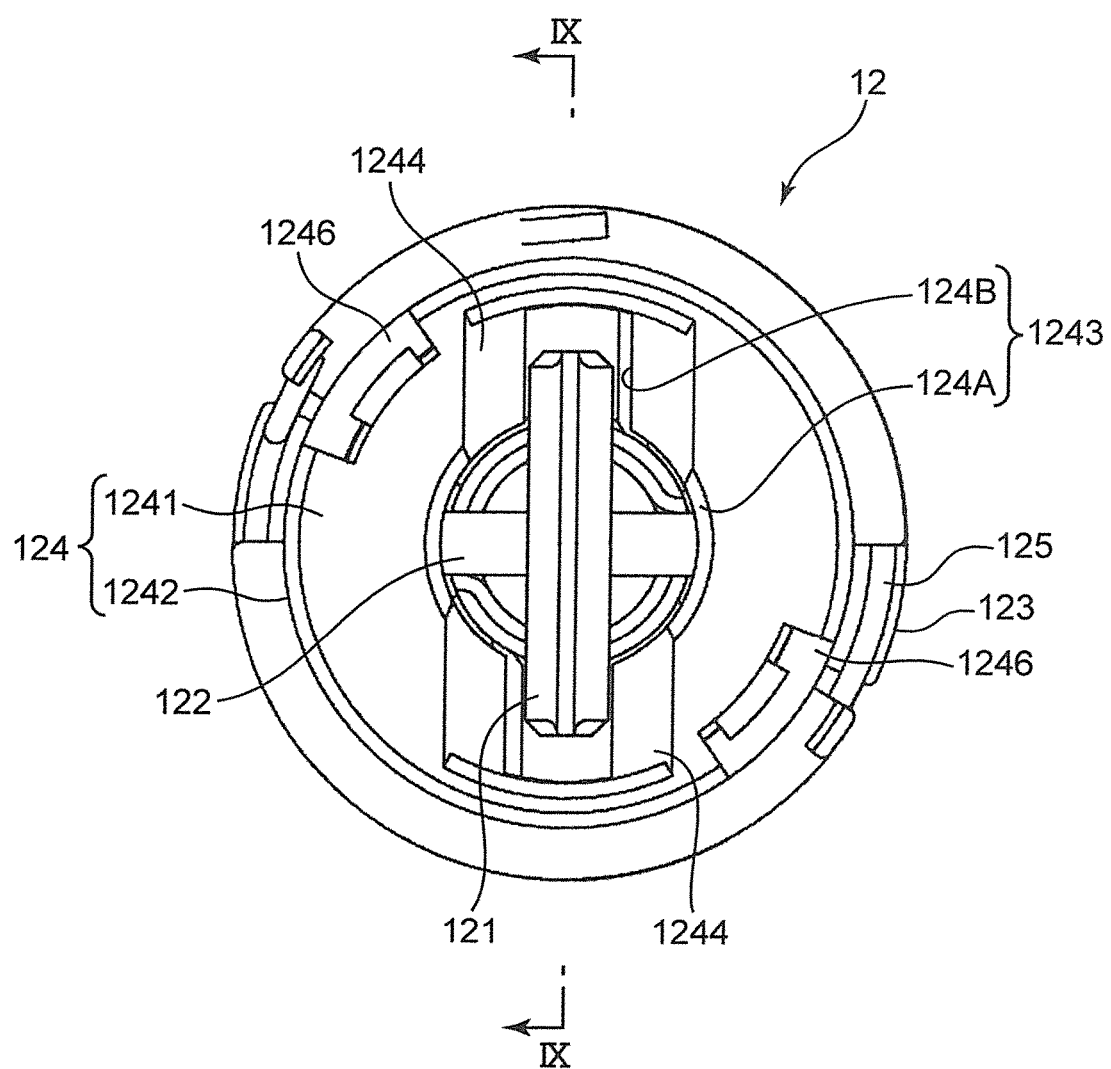
FIG. 4 is a plan view of the joint portion.
Figure 5:
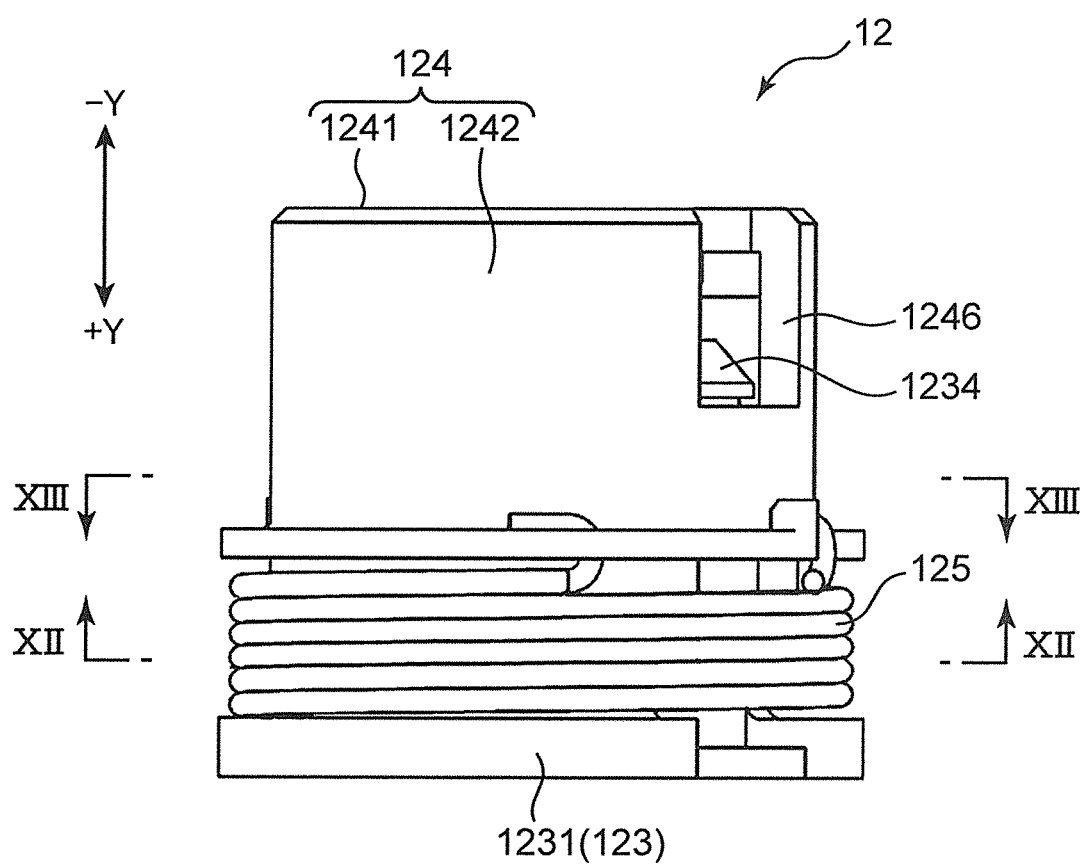
FIG. 5 is a side view of the joint portion.
Figure 6:
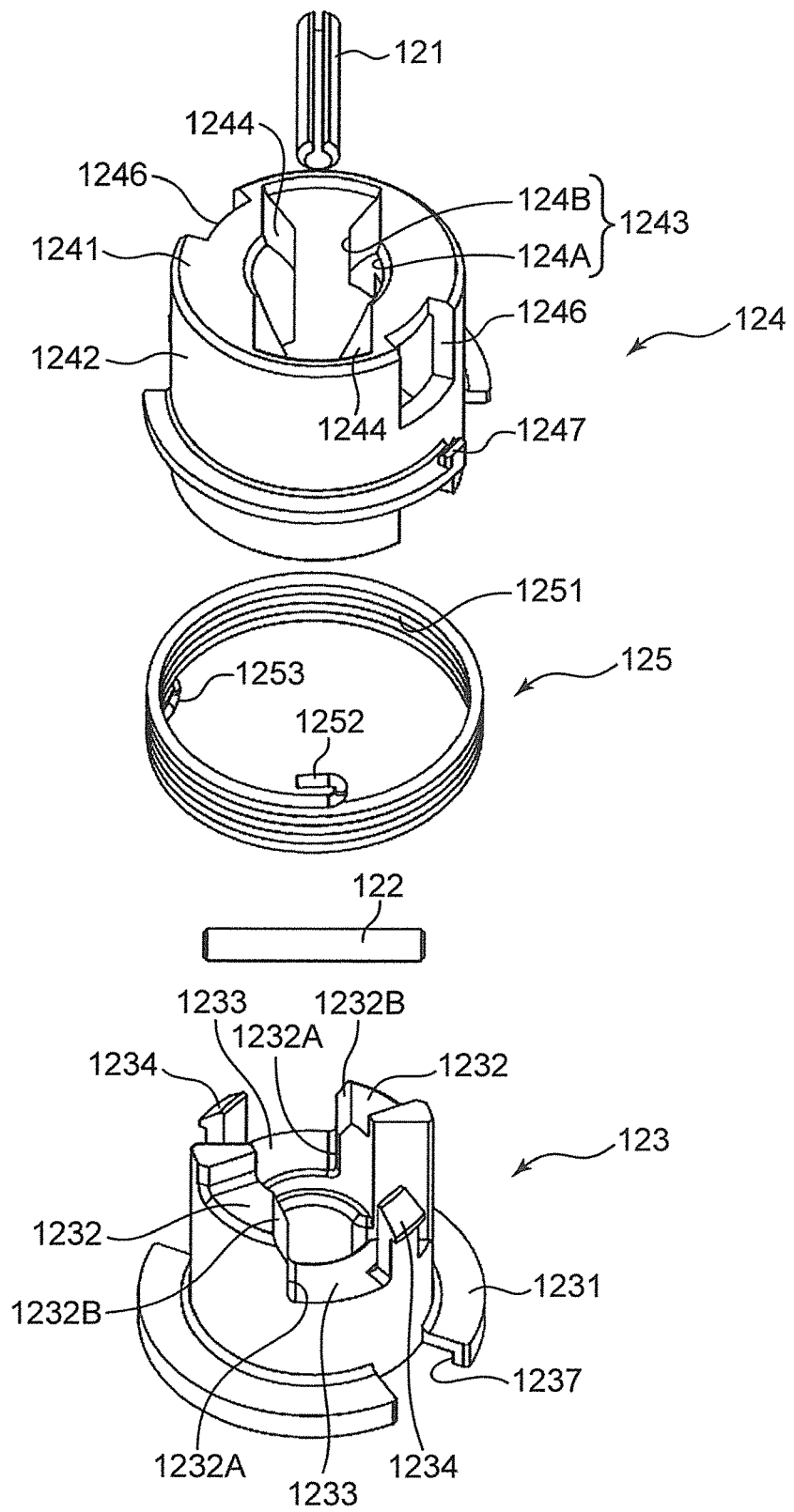
FIG. 6 is an exploded perspective view of the joint portion.

Next, the joint portion 12 will be described with reference to FIG. 3 to FIG. 6 in addition to FIG. 2. FIG. 3 is a perspective view showing a configuration of the joint portion 12 of the joint mechanism 11. FIG. 4 is a plan view of the joint portion 12, and FIG. 5 is a side view of the joint portion 12. FIG. 6 is an exploded perspective view of the joint portion 12.

The joint portion 12 is configured to include a drive side engagement pin 121, a follower side engagement pin 122, a first coupling 123, a second coupling 124, and a biasing member 125.

The drive side engagement pin 121 is a spring pin provided at a front end portion of the drive shaft 10A. The drive side engagement pin 121 is arranged at the front end portion of the drive shaft 10A such that both end portions of the drive side engagement pin project from a circumference surface of the drive shaft 10A in a radial direction. The drive side engagement pin 121 rotates in the same direction according to rotation of the drive shaft 10A. The drive shaft 10A is driven to rotate in a predetermined rotation direction R1 by a driving force from the sheet feed driving motor. The follower side engagement pin 122 is a parallel pin provided at a front end portion of the follower shaft 10B. The follower side engagement pin 122 is provided such that both end portions thereof project from a circumference surface of the follower shaft 10B in a radial direction. The follower side engagement pin 122 rotates in the same direction according to the rotation of the follower shaft 10B. The follower shaft 10B rotates accompanying the rotation of the drive shaft 10A in the same rotation direction R1 as that of the drive shaft 10A.

Figure 7:
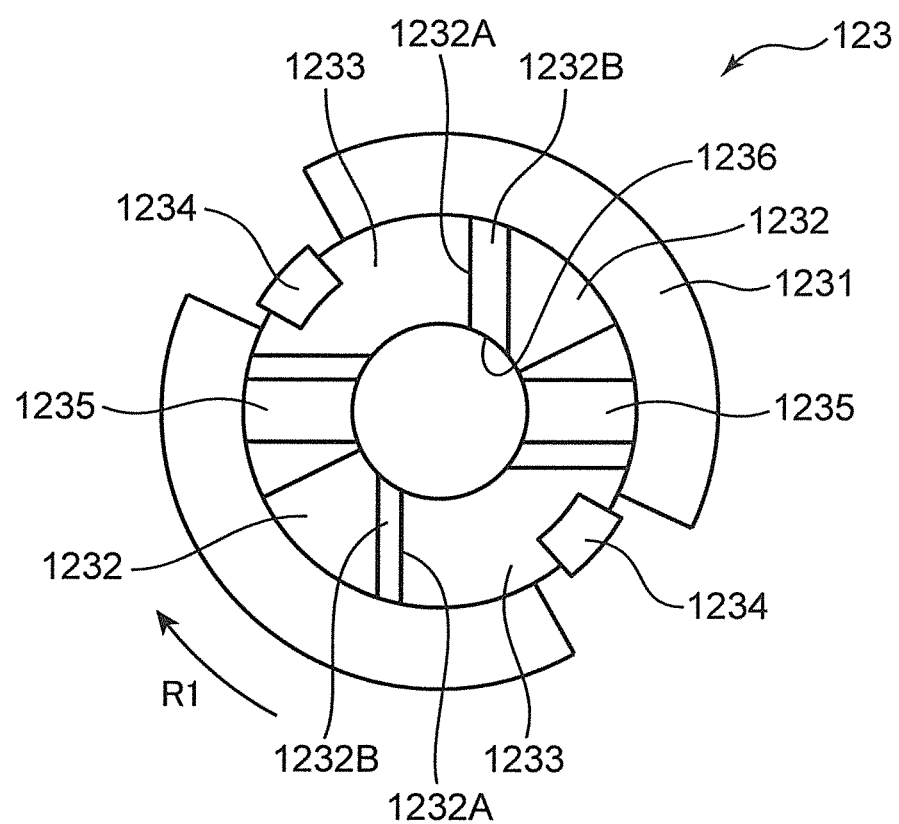
FIG. 7 is a view of a first coupling of the joint portion seen from a front side thereof.
Figure 8:
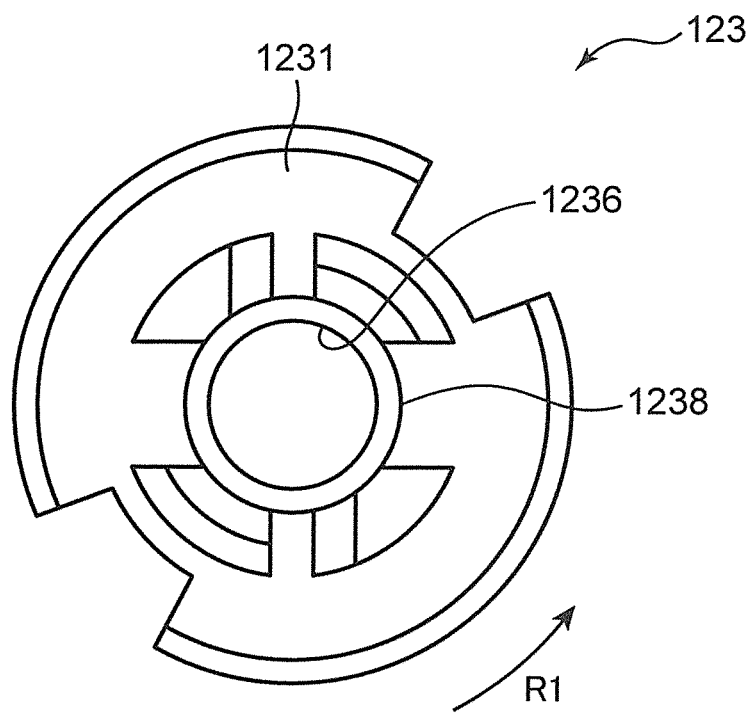
FIG. 8 is a view of the first coupling seen from a rear side thereof.
Figure 9:
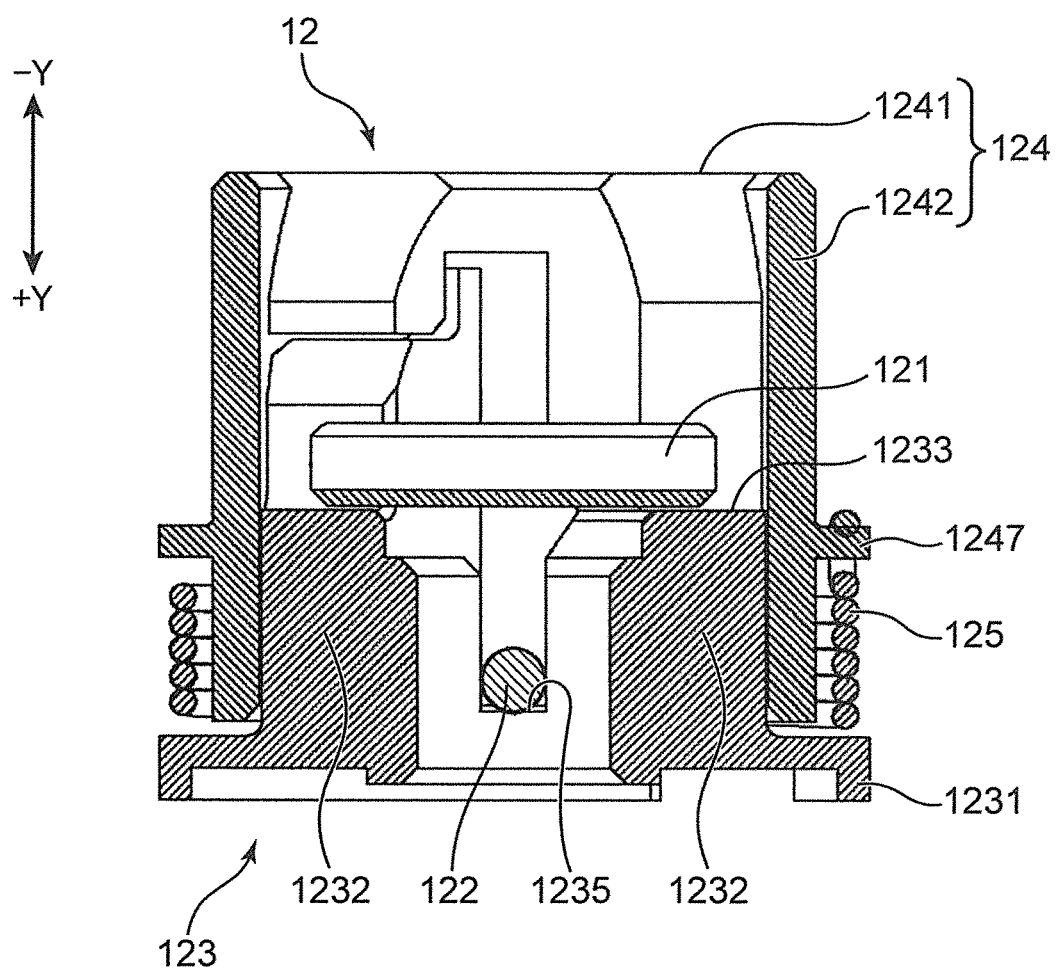
FIG. 9 is a sectional view taken along cut surface line IX-IX in FIG. 4.

The first coupling 123 is supported at the front end portion of the follower shaft 10B via the follower side engagement pin 122 so as to be rotatable following the follower shaft 10B on the same axis. The first coupling 123 will be described with reference to FIG. 7 to FIG. 9 in addition to FIG. 3 to FIG. 6. FIG. 7 is a view of the first coupling 123 of the joint portion 12 seen from a front side thereof. FIG. 8 is a view of the first coupling 123 seen from a rear side thereof. FIG. 9 is a sectional view taken along cut surface line IX-IX in FIG. 4.

The first coupling 123 includes a base portion 1231 and a pair of projections 1232. The base portion 1231 is a part formed to be generally disc-shaped. The base portion 1231 has an insertion opening portion 1236 (see FIGS. 7 and 8) opened at the center, an engagement portion 1237 (see FIG. 6) formed to have a part of an outer circumference end portion thereof cut away, and an attachment portion 1238 (see FIG. 8) formed on a back surface (a surface on the +Y side). The insertion opening portion 1236 is an opening into which the front end portion of the follower shaft 10B is allowed to be inserted. The engagement portion 1237 is a part with which an end portion of the biasing member 125 to be described later is engaged. The attachment portion 1238 is a part to which an end portion of the joint biasing member 14 is attached.

On a front surface (a surface on the −Y side, the surface being opposed to the drive side engagement pin 121) of the base portion 1231, the pair of projections 1232 are provided at an interval in the rotation direction R1 to project on the −Y side along the axis direction (the Y direction) so as to surround the insertion opening portion 1236. Each of the pair of projections 1232 is provided with an engagement recessed portion 1233 and an engagement projecting piece portion 1234. The engagement projecting piece portion 1234 is a projecting piece which is provided at an upstream end of the projection 1232 in the rotation direction R1 and which is engaged with a cutout portion 1246 of the second coupling 124, to be described later, that is attached to the first coupling 123. Engagement of the engagement projecting piece portion 1234 with the cutout portion 1246 regulates movement of the second coupling 124 with respect to the first coupling 123 in the axis direction, thereby retaining the second coupling 124.

The engagement recessed portion 1233 is a recessed part which has a predetermined length in the rotation direction R1 and is recessed to the +Y side. Both end portions of the drive side engagement pin 121 are freely engaged or disengaged with the engagement recessed portions 1233 of the pair of projections 1232, respectively (see FIG. 9).

Additionally, a pair of engagement grooves 1235 are formed between the pair of projections 1232 arranged at an interval in the rotation direction R1 (see FIGS. 7 and 9). Both end portions of the follower side engagement pin 122 are fixedly engaged with the pair of engagement grooves 1235, respectively. In this manner, the first coupling 123 is supported at the front end portion of the follower shaft 10B so as to be rotatable following the follower shaft 10B on the same axis.

In a state where both end portions of the drive side engagement pin 121 are engaged with the engagement recessed portions 1233, respectively, and both end portions of the follower side engagement pin 122 are engaged with the pair of engagement grooves 1235, the drive side engagement pin 121 and the follower side engagement pin 122 cross at right angles in a plan view from the axis direction (see FIGS. 4 and 9).

Figure 10:
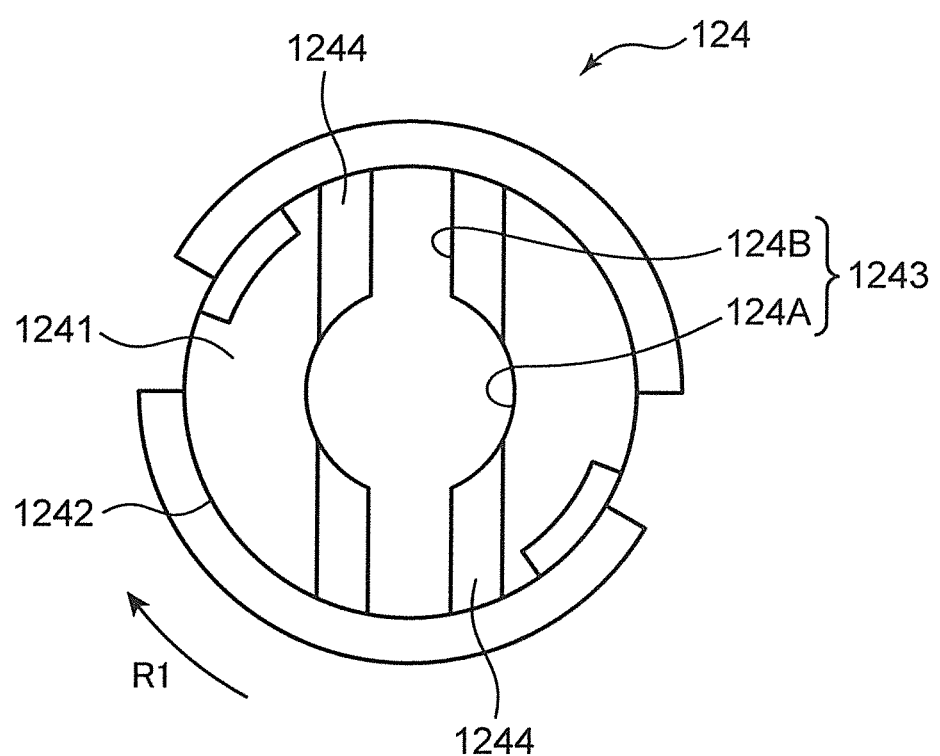
FIG. 10 is a view of a second coupling of the joint portion seen from a front side thereof.
Figure 11:
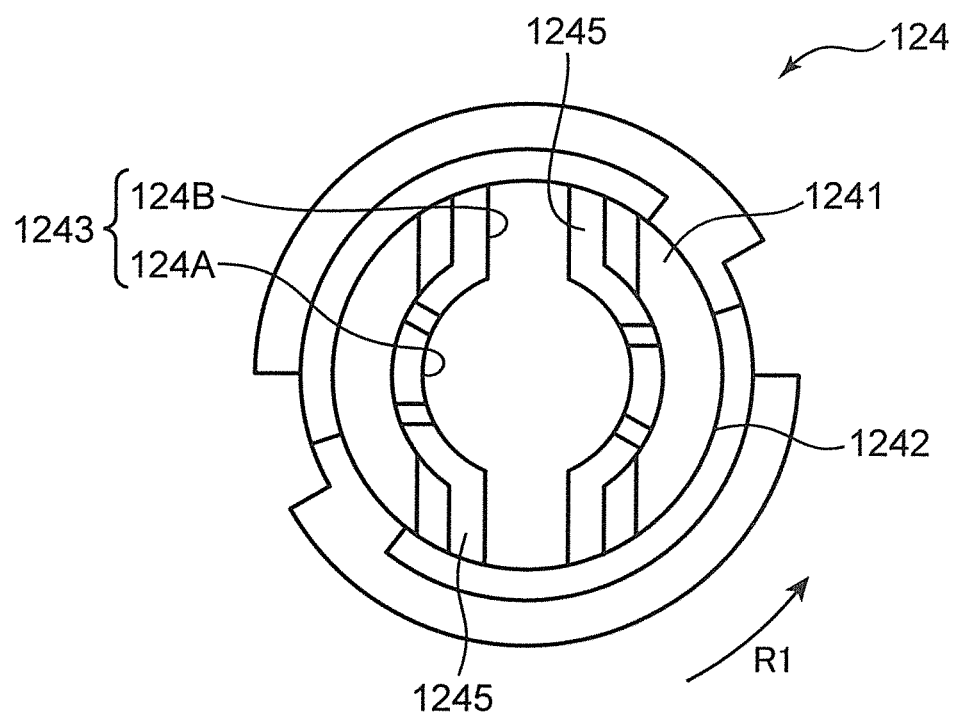
FIG. 11 is a view of the second coupling seen from a rear side thereof.
Figure 12:
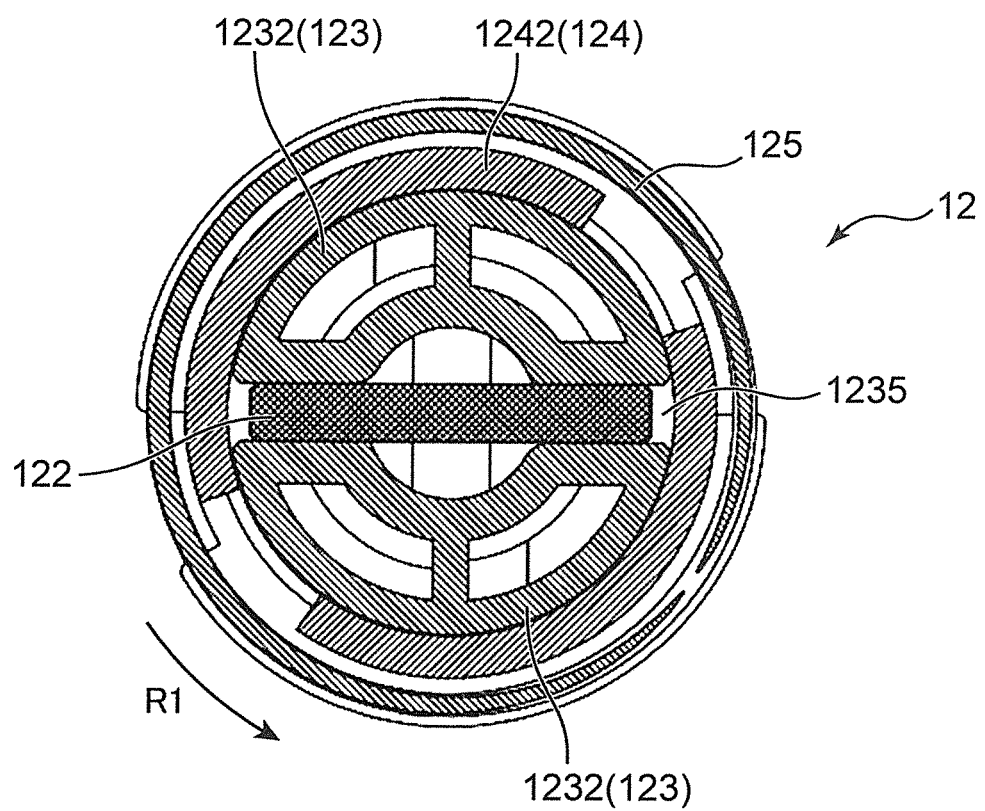
FIG. 12 is a sectional view taken along cut surface line XII-XII in FIG. 5.
Figure 13:
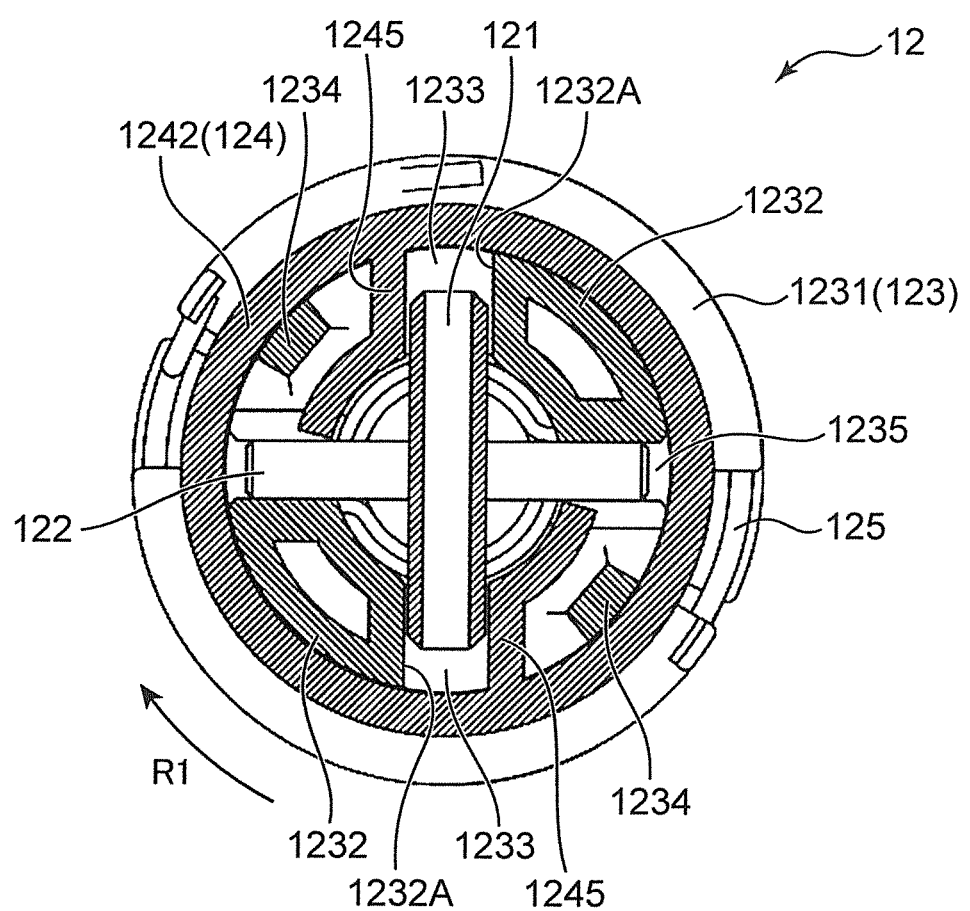
FIG. 13 is a sectional view taken along cut surface line XIII-XIII in FIG. 5.

Next, the second coupling 124 is attached to the first coupling 123 so as to cover the pair of projections 1232 from the −Y side. The second coupling 124 will be described with reference to FIG. 10 to FIG. 13 in addition to FIG. 3 to FIG. 6. FIG. 10 is a view of the second coupling 124 of the joint portion 12 seen from a front side thereof. FIG. 11 is a view of the second coupling 124 seen from a rear side thereof. FIG. 12 is a sectional view taken along cut surface line XII-XII in FIG. 5. FIG. 13 is a sectional view taken along cut surface line XIII-XIII in FIG. 5.

The second coupling 124 is formed to have a cover-shape including a top wall 1241 and a circumferential wall 1242. The top wall 1241 is a part formed to be generally disc-shaped. The top wall 1241 has an opening portion 1243 opened at the center thereof (see FIGS. 6, 10, and 11). The opening portion 1243 is an opening into which the drive shaft 10A provided with the drive side engagement pin 121 is allowed to be inserted.

The circumferential wall 1242 is a wall portion extending from an outer circumference edge of the top wall 1241 along the axis direction (the Y direction). The circumferential wall 1242 has a pair of projecting pieces 1245 (see FIGS. 11 and 13) projecting inwardly from an inner circumference surface, a pair of cutout portions 1246 (see FIG. 6) formed by cutting a part of the circumferential wall 1242 away, and an engagement portion 1247 formed on an outer circumference surface (see FIG. 6). The engagement portion 1247 is a part with which the end portion of the biasing member 125, to be described later, is engaged. The pair of cutout portions 1246 are parts with which the engagement projecting piece portions 1234 formed in the pair of projections 1232 in the first coupling 123 are engaged, respectively. Engagement of the engagement projecting piece portion 1234 with the cutout portion 1246 retains the second coupling 124 in the first coupling 123.

In a state where the second coupling 124 is attached to the first coupling 123, the pair of projecting pieces 1245 are arranged in the engagement recessed portions 1233 formed in the pair of projections 1232 of the first coupling 123, respectively. In each engagement recessed portion 1233, the pair of projecting pieces 1245 are opposed, on an upstream side in the rotation direction R1, to opening defining surfaces 1232A of the pair of projections 1232, the opening defining surfaces 1231A defining an opening side end portion of each engagement recessed portion 1233 on a downstream side in the rotation direction R1 (see FIG. 13). Each front end portion of the opening defining surfaces 1232A of the pair of projections 1232 is a slant surface 1232B (see FIG. 6).

Next, the biasing member 125 biases the second coupling 124 attached to the first coupling 123 to the first coupling 123 in the rotation direction R1 (see FIGS. 3, 5, and 9). The biasing member 125 is a torsion coil spring configured to include a coil portion 1251, a first arm portion 1252, and a second arm portion 1253 as shown in FIG. 6. The coil portion 1251 is inserted into the circumferential wall 1242 of the second coupling 124. The first arm portion 1252 is connected to one end of the coil portion 1251 and has a front end engaged with the engagement portion 1247 of the second coupling 124. The second arm portion 1253 is connected to the other end of the coil portion 1251 and has a front end engaged with the engagement portion 1237 of the first coupling 123.

Then, both end portions of the drive side engagement pin 121, inserted into the respective engagement recessed portions 1233 via the opening portion 1243 of the second coupling 124 attached to the first coupling 123, are engaged with the respective engagement recessed portions 1233 so as to be each sandwiched between each of the pair of projecting pieces 1245 being applied an biasing force of the biasing member 125 and each opening defining surface 1232A of the pair of projections 1232 (see FIG. 13).

In this manner, in a state where both end portions of the drive side engagement pin 121 are engaged with the respective engagement recessed portions 1233, a clearance in the rotation direction R1 can be reduced as soon as possible, the clearance being between both end portions of the drive side engagement pin 121 and the opening side end portions of the respective engagement recessed portions 1233. Accordingly, the joint mechanism 11 which links the drive shaft 10A and the follower shaft 10B on the same axis is allowed to be the joint mechanism 11 having excellent responsiveness in transmission of a rotation driving force from the drive shaft 10A to the follower shaft 10B.

Additionally, in the second coupling 124, the opening portion 1243 of the top wall 1241 includes a first opening 124A into which the drive shaft 10A is allowed to be inserted, and a pair of second openings 124B which communicate from the first opening 124A in the radial direction and into which both end portions of the drive side engagement pin 121 are allowed to be inserted. Then, the top wall 1241 has a pair of guide slant surfaces 1244 (see FIGS. 6 and 10) which each slant from an opening edge, on the upstream side in the rotation direction R1, of each of the pair of second openings 124B to an outer side in the axis direction (the Y direction). The pair of guide slant surfaces 1244 guide both end portions of the drive side engagement pin 121 to be inserted into the engagement recessed portions 1233 via the pair of second openings 124B.

In this embodiment, when the drive side engagement pin 121 is inserted into the engagement recessed portion 1233 via the opening portion 1243 of the second coupling 124, both end portions of the drive side engagement pin 121 come into contact with the pair of guide slant surfaces 1244. In other words, when the drive side engagement pin 121 is inserted into the engagement recessed portion 1233, the pair of guide slant surfaces 1244 receive a pressing force along the axis direction (the Y direction) from both end portions of the drive side engagement pin 121. When the pair of guide slant surfaces 1244 receive the pressing force, the second coupling 124 is subjected to action of a force directing from the downstream side to the upstream side in the rotation direction R1 due to a component of force vertical to the guide slant surface 1244 to rotate in a direction reverse to the rotation direction R1 against the biasing force of the biasing member 125. As a result, the pair of projecting pieces 1245 of the second coupling 124 separate from the opening defining surfaces 1232A of the pair of projections 1232 in each engagement recessed portion 1233. This makes insertion of the drive side engagement pin 121 into the engagement recessed portion 1233 easier.

On the other hand, when both end portions of the drive side engagement pin 121 pass the pair of guide slant surfaces 1244 to be engaged with the engagement recessed portions 1233, the pressing force of the drive side engagement pin 121 to the guide slant surface 1244 is released. Then, the second coupling 124 rotates in the rotation direction R1 due to the biasing force of the biasing member 125. As a result, the pair of projecting pieces 1245 of the second coupling 124 comes close to the opening defining surfaces 1232A of the pair of projections 1232 in the engagement recessed portions 1233. Both end portions of the drive side engagement pin 121 are therefore engaged with the engagement recessed portions 1233 so as to be sandwiched between the pair of projecting pieces 1245 being applied the biasing force of the biasing member 125 and the opening defining surfaces 1232A of the pair of projections 1232. This makes it possible to reduce a clearance, in the rotation direction R1, between the drive side engagement pin 121 and the opening side end portion of the engagement recessed portion 1233 in a state where the drive side engagement pin 121 is engaged with the engagement recessed portion 1233.

As described above, the drive shaft 10A is provided with the drive transmission gear 132 via the one-way clutch 131.

When the sheet feed driving motor stops, rotation of the drive transmission gear 132 stops, which is followed by stop of rotation of the drive shaft 10A. When the drive shaft 10A stops rotation, the follower shaft 10B stops rotation as well, however, the follower shaft 10B might rotate in some cases with the sheet feed driving motor being stopped, upon receiving an external force different from the rotation driving force transmitted from the drive shaft 10A. Specifically, in a state where an assist driving motor which causes the assist roller 43 to rotate is driven in the sheet feeding portion 4 with the sheet feed driving motor stopped, the sheet P transported by rotation of the assist roller 43 causes the sheet feeding roller 42 to rotate, which is followed by rotation of the follower shaft 10B.

In such a case, even when the one-way clutch 131 provided between the drive transmission gear 132 and the drive shaft 10A prevents the drive transmission gear 132 from rotating, in the engagement recessed portion 1233, both end portions of the drive side engagement pin 121 receive a biasing force of the biasing member 125 via the pair of projecting pieces 1245, so that the drive shaft 10A is allowed to rotate in conjunction with rotation of the follower shaft 10B. It is therefore possible to prevent the clearance in the rotation direction R1 from increasing, the clearance located between the drive side engagement pin 121 and the opening side end portion of the engagement recessed portion 1233, even when the follower shaft 10B receives the external force to rotate.

Figure 14:
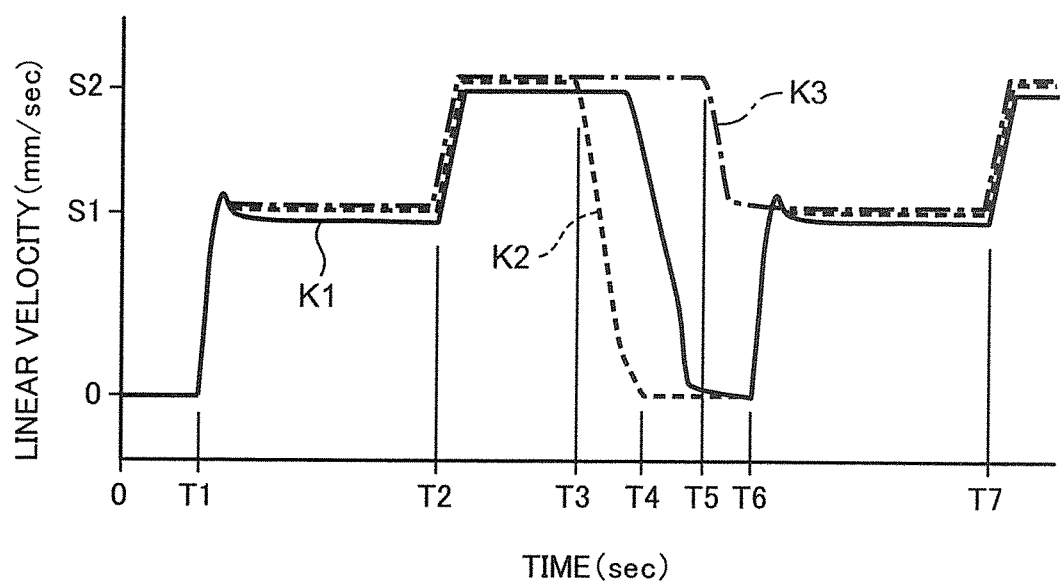
FIG. 14 is a graph related to sheet transportation operation in a case where the joint mechanism is applied to a sheet feeding roller in a sheet feeding portion.

Next, transportation operation of the sheet P by the sheet feeding portion 4 in the image forming apparatus 1 will be described with reference to FIG. 14. FIG. 14 is a graph related to the transportation operation of the sheet P when the joint mechanism 11 is applied to the sheet feeding roller 42 in the sheet feeding portion 4. In the graph of FIG. 14, a characteristic line K1 is plotted with a relation between a time lapse from when an instruction signal for transporting sheet P to the sheet feeding portion 4 is input and a linear velocity of the sheet feeding roller 42. A characteristic line K2 is plotted with a relation between a time lapse and a linear velocity of the sheet feed driving motor. A characteristic line K3 is plotted with a relation between a time lapse and a linear velocity of the assist driving motor.

At a time lapse T1, when the sheet feed driving motor and the assist driving motor start operation, the linear velocity of each motor is enhanced and maintained at a predetermined linear velocity S1. At the timing when the sheet feed driving motor starts, the one-way clutch 131 is switched from the released state to the transmission state. As a result, the rotation driving force of the sheet feed driving motor is transmitted to the drive shaft 10A via the drive transmission gear 132, so that the drive shaft 10A rotates. The follower shaft 10B linked to the drive shaft 10A via the joint portion 12 rotates accompanying rotation of the drive shaft 10A, which is followed by rotation of the sheet feeding roller 42. The linear velocity of the sheet feeding roller 42 therefore shifts in the generally same manner as the linear velocity of the sheet feed driving motor. The assist roller 43 rotates according to driving of the assist driving motor. The first sheet P is transported by the rotation of the sheet feeding roller 42 and the assist roller 43.

Next, at a time lapse T2, the linear velocities of the sheet feed driving motor and the assist driving motor are enhanced and maintained to be constant at a linear velocity S2 higher than the linear velocity S1. According to acceleration of the sheet feed driving motor and the assist driving motor, the linear velocities of the sheet feeding roller 42 and the assist roller 43 are accelerated. This causes the sheet P to be transported at a high speed.

Next, at a time lapse T3, a stop instruction signal for the sheet feed driving motor is input to the sheet feeding portion 4. This reduces the linear velocity of the sheet feed driving motor, so that the sheet feed driving motor stops at a time lapse T4. At the time lapse T3, the one-way clutch 131 is switched from the transmission state to the released state.

Additionally, although the sheet feed driving motor has a speed reduced according to the stop instruction signal input at the time lapse T3 and shortly stops, since the assist driving motor is being driven, the sheet feeding roller 42 rotates due to the sheet P transported by the rotation of the assist roller 43. Therefore, in a time zone from the time lapse T3 to the time lapse T4, the linear velocity of the sheet feeding roller 42, unlike the linear velocity of the sheet feed driving motor, shifts generally in the same manner as that of the linear velocity of the assist driving motor. The linear velocity of the sheet feeding roller 42 starts decreasing upon leaving contact with the sheet P transported by the assist roller 43 and shortly stops.

Next at a time lapse T5, a speed reduction instruction signal for the assist driving motor is input to the sheet feeding portion 4 for the reception of the second sheet P by the assist roller 43. This causes the linear velocity of the assist driving motor to be reduced from the linear velocity S2 to the linear velocity S1.

Next, at a time lapse T6, when the sheet feed driving motor starts for transporting the second sheet P by the sheet feeding roller 42, the linear velocity of the sheet feed driving motor is enhanced and maintained to be constant at the predetermined linear velocity S1. At the timing when the sheet feed driving motor starts, the one-way clutch 131 is switched from the released state to the transmission state. As a result, the follower shaft 10B linked to the drive shaft 10A via the joint portion 12 rotates accompanying rotation of the drive shaft 10A, which is followed by rotation of the sheet feeding roller 42. The second sheet P is transported by the rotation of the sheet feeding roller 42 and the assist roller 43. Then, at a time lapse T7, the linear velocities of the sheet feed driving motor and the assist driving motor are enhanced, and the linear velocities of the sheet feeding roller 42 and the assist roller 43 are responsively enhanced. This causes the second sheet P to be transported at a high speed. The foregoing operation will be repeated according to the number of sheets P to be printed.

Here, at the time lapse T4 when the sheet feed driving motor stops, rotation of the drive transmission gear 132 stops. Thus, even when the rotation of the drive transmission gear 132 stops, both end portions of the drive side engagement pin 121 in the engagement recessed portions 1233 receive a biasing force of the biasing member 125 via the pair of projecting pieces 1245, so that the drive shaft 10A having the one-way clutch 131 in the released state rotates in conjunction with rotation of the follower shaft 10B following the sheet feeding roller 42.

In this manner, an increase in the clearance in the rotation direction R1 between the drive side engagement pin 121 and the opening side end portion of the engagement recessed portion 1233 is suppressed. Thus, in the joint mechanism 11 which links the drive shaft 10A and the follower shaft 10B on the same axis, excellent responsiveness can be obtained of transmission of a rotation driving force from the drive shaft 10A to the follower shaft 10B. Accordingly, it is possible to prevent, at the time lapse T6, start timing of rotation of the sheet feeding roller 42 by the follower shaft 10B from delaying from start timing of rotation of the drive shaft 10A following start of the sheet feed driving motor. This realizes the image forming apparatus 1 which has excellent property of high-speed transportation of the sheet P by the sheet feeding roller 42 and which is excellent in applicability to high-speed printing.

While the embodiment of the present disclosure has been described in the foregoing, the present disclosure is not limited thereto and can adopt various modified embodiments. Although the above embodiment has been described with respect to the configuration in which the joint mechanism 11 is applied to the sheet feeding roller 42 in the sheet feeding portion 4, the present disclosure is not limited to such a configuration. For example, the joint mechanism 11 is applicable to a portion which links a drive shaft and a follower shaft on the same axis, such as the assist roller 43, other roller member for sheet transport, or the like.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A joint mechanism which links a drive shaft and a follower shaft on the same axis along an axis direction and is capable of transmitting a rotation driving force of the drive shaft to the follower shaft, the drive shaft being driven to rotate in a predetermined rotation direction by a driving force from a driving source, and the follower shaft rotating in the rotation direction accompanying rotation of the drive shaft, the joint mechanism comprising:
    an engagement pin provided at a front end portion of the drive shaft and having both end portions projecting from a circumference surface of the drive shaft in a radial direction;
    a first coupling supported at a front end portion of the follower shaft so as to be rotatable following the follower shaft on the same axis and having a pair of projections with engagement recessed portions formed respectively, the engagement recessed portions with which both end portions of the engagement pin are freely engaged or disengaged;
    a second coupling including a top wall and a circumferential wall and is attached to the first coupling so as to cover the pair of projections, the top wall having an opening portion into which the drive shaft provided with the engagement pin is allowed to be inserted, and the circumferential wall extending from an outer circumference edge of the top wall along the axis direction and having a pair of projecting pieces projecting inwardly from an inner circumference surface; and
    a biasing member which biases the second coupling attached to the first coupling in the rotation direction with respect to the first coupling, wherein
    the pair of projecting pieces are arranged in the engagement recessed portions, in a state where the second coupling is attached to the first coupling, so as to be opposed, on an upstream side in the rotation direction, to opening defining surfaces of the pair of projections, the opening defining surfaces defining an opening side end portion of each of the engagement recessed portions on a downstream side in the rotation direction, and
    both end portions of the engagement pin inserted from the opening portion of the top wall are engaged with the respective engagement recessed portions so as to be each sandwiched between each of the pair of projecting pieces being applied an biasing force of the biasing member and each of the opening defining surfaces of the pair of projections.

2. The joint mechanism according to claim 1, wherein the biasing member is a torsion coil spring configured to include:
    a coil portion to be inserted into the circumferential wall of the second coupling;
    a first arm portion connected to one end of the coil portion and having a front end engaged with the second coupling; and
    a second arm portion connected to the other end of the coil portion and having a front end engaged with the first coupling.

3. The joint mechanism according to claim 2, wherein the opening portion of the top wall includes:
    a first opening into which the drive shaft is allowed to be inserted; and
    a pair of second openings which communicate from the first opening in the radial direction and into which both end portions of the engagement pin are allowed to be inserted;
    the top wall has a pair of guide slant surfaces which each slant from an opening edge, on the upstream side in the rotation direction, of each of the pair of second openings to an outer side in the axis direction, and guide both end portions of the engagement pin to be inserted into the pair of second openings, and
    the second coupling attached to the first coupling
        rotates in a direction reverse to the rotation direction against the biasing force of the biasing member such that the pair of projecting pieces separate from the opening defining surfaces of the pair of projections in the engagement recessed portions when both end portions of the engagement pin come into contact with the pair of guide slant surfaces and are inserted into the pair of second openings, and
        rotates in the rotation direction due to the biasing force of the biasing member such that the pair of projecting pieces come close to the opening defining surfaces of the pair of projections in the engagement recessed portions when both end portions of the engagement pin pass the pair of guide slant surfaces to be engaged with the engagement recessed portions.

4. The joint mechanism according to claim 3, further comprising:
    a drive transmission gear that transmits the driving force from the driving source to the drive shaft and that is provided on the drive shaft on the same axis via a one-way clutch.

5. An image forming apparatus comprising:
a drive shaft driven to rotate in a predetermined rotation direction by a driving force from a driving source;
a roller member which has a follower shaft that rotates accompanying rotation of the drive shaft in the rotation direction and which transports a sheet by the rotation of the follower shaft;
an image forming portion which forms an image on a sheet transported by the roller member; and
the joint mechanism according to claim 1 which links the drive shaft and the follower shaft on the same axis along an axis direction.

* * * * *